United States Patent
Morimura

(10) Patent No.: US 12,309,724 B2
(45) Date of Patent: May 20, 2025

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Kazuhiko Morimura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 365 days.

(21) Appl. No.: 17/842,022

(22) Filed: Jun. 16, 2022

(65) Prior Publication Data

US 2023/0017152 A1    Jan. 19, 2023

(30) Foreign Application Priority Data

Jul. 14, 2021   (JP) ................. 2021-116596

(51) Int. Cl.
| | |
|---|---|
| *H04W 72/04* | (2023.01) |
| *H04J 3/06* | (2006.01) |
| *H04W 48/18* | (2009.01) |
| *H04W 56/00* | (2009.01) |

(52) U.S. Cl.
CPC ......... *H04W 56/001* (2013.01); *H04J 3/0667* (2013.01); *H04W 48/18* (2013.01)

(58) Field of Classification Search
CPC ..... H04J 3/0641; H04J 3/0667; H04W 48/18; H04W 56/001
See application file for complete search history.

(56) References Cited

U.S. PATENT DOCUMENTS

| | | | |
|---|---|---|---|
| 11,089,542 B2* | 8/2021 | Kuge | H04W 8/04 |
| 2018/0062992 A1* | 3/2018 | Cohn | H04L 69/22 |
| 2018/0242198 A1* | 8/2018 | Choi | H04L 67/51 |
| 2023/0062362 A1* | 3/2023 | Sun | H04W 72/20 |
| 2024/0155478 A1* | 5/2024 | Gandikota | H04W 28/24 |

FOREIGN PATENT DOCUMENTS

| | | | | |
|---|---|---|---|---|
| WO | WO-2017214932 A1 * | 12/2017 | ......... | G06F 9/45558 |
| WO | WO-2018074953 A1 * | 4/2018 | ......... | H04L 41/0894 |
| WO | WO-2018082221 A1 * | 5/2018 | ......... | H04W 36/0016 |
| WO | WO-2018170922 A1 * | 9/2018 | ......... | H04L 41/0806 |

OTHER PUBLICATIONS

3GPP "3rd Generation Partnership Project; Technical Specification Group Services and System Aspects; System Architecture for the System; Stage 2 (Release 15)" 3GPP TS 23.501 V15.1.0 (Mar. 2018) pp. 1-201.

* cited by examiner

*Primary Examiner* — Phuc H Tran
(74) *Attorney, Agent, or Firm* — Carter, DeLuca & Farrell LLP

(57) ABSTRACT

A communication apparatus requests, to a network, allocation of a first network slice for executing predetermined processing required when executing a communication service executed by the communication apparatus and allocation of a second network slice for the communication service, supplies a result of the predetermined processing executed in the first network slice for communication in the second network slice, and performs communication by using the result of the predetermined processing in the second network slice.

9 Claims, 7 Drawing Sheets

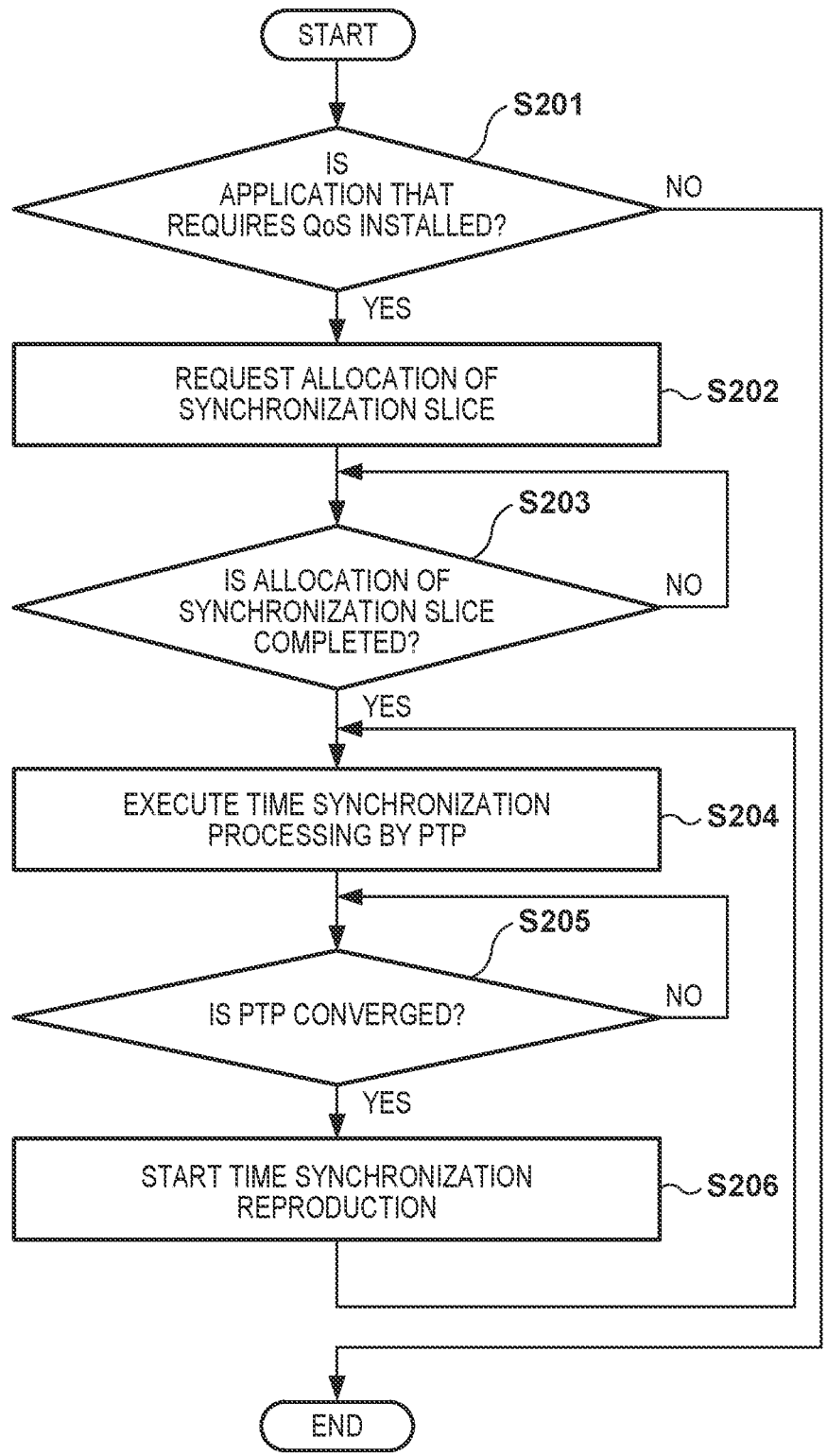

| SST Value | Service Type | Characteristics |
|---|---|---|
| 1 | eMBB | 5G EXTENDED MOBILE COMMUNICATION |
| 2 | URLLC | 5G HIGH RELIABILITY LOW LATENCY COMMUNICATION |
| 3 | MIoT | 5G VERY LARGE NUMBER OF TERMINAL |
| 4 | V2X | 5G VEHICLE-TO-VEHICLE COMMUNICATION |
| 5-127 | — | RESERVED |
| 128-255 | — | FOR OPERATOR |

F I G. 4

| 5QI | Resource Type | Priority | Packet Delay Budget | Packet Loss Rate | Data Burst Volume | Example Service |
|---|---|---|---|---|---|---|
| 10 | Delay Critical GBR | 11 | 5ms | $10^{-5}$ | 160B | Remote Control |
| 11 | | 12 | 10ms | $10^{-5}$ | 320B | ITS |
| 12 | | 13 | 20ms | $10^{-5}$ | 640B | — |
| 16 | | 18 | 10ms | $10^{-4}$ | 255B | Discrete Automation |
| 17 | | 19 | 10ms | $10^{-4}$ | 1358B | Discrete Automation |
| 1 | GBR (Guaranteed Bit Rate) | 20 | 100ms | $10^{-2}$ | N/A | Conversational Voice |
| 2 | | 40 | 150ms | $10^{-3}$ | N/A | Conversational Video |
| 3 | | 30 | 50ms | $10^{-3}$ | N/A | Real Time Game |
| 4 | | 50 | 300ms | $10^{-6}$ | N/A | Non-Conversational Video |
| 65 | | 7 | 75ms | $10^{-6}$ | N/A | IMS Signaling |
| 66 | | 20 | 100ms | $10^{-2}$ | N/A | Buffered-Video |
| 75 | | 25 | 50ms | $10^{-2}$ | N/A | Live Streaming |
| E | | 18 | 10ms | $10^{-4}$ | 255B | Video (TCP Based) |
| F | | 19 | 10ms | | 1358B | |
| 5 | Non-GBR | 1 | 100ms | $10^{-6}$ | — | IMS Signaling |
| 6 | | 6 | 300ms | $10^{-6}$ | — | Buffered-Video |
| 7 | | 7 | 100ms | $10^{-3}$ | — | Live Streaming |
| 8 | | 8 | 300ms | $10^{-6}$ | — | Video (TCP Based) |
| 9 | | 9 | | | | |

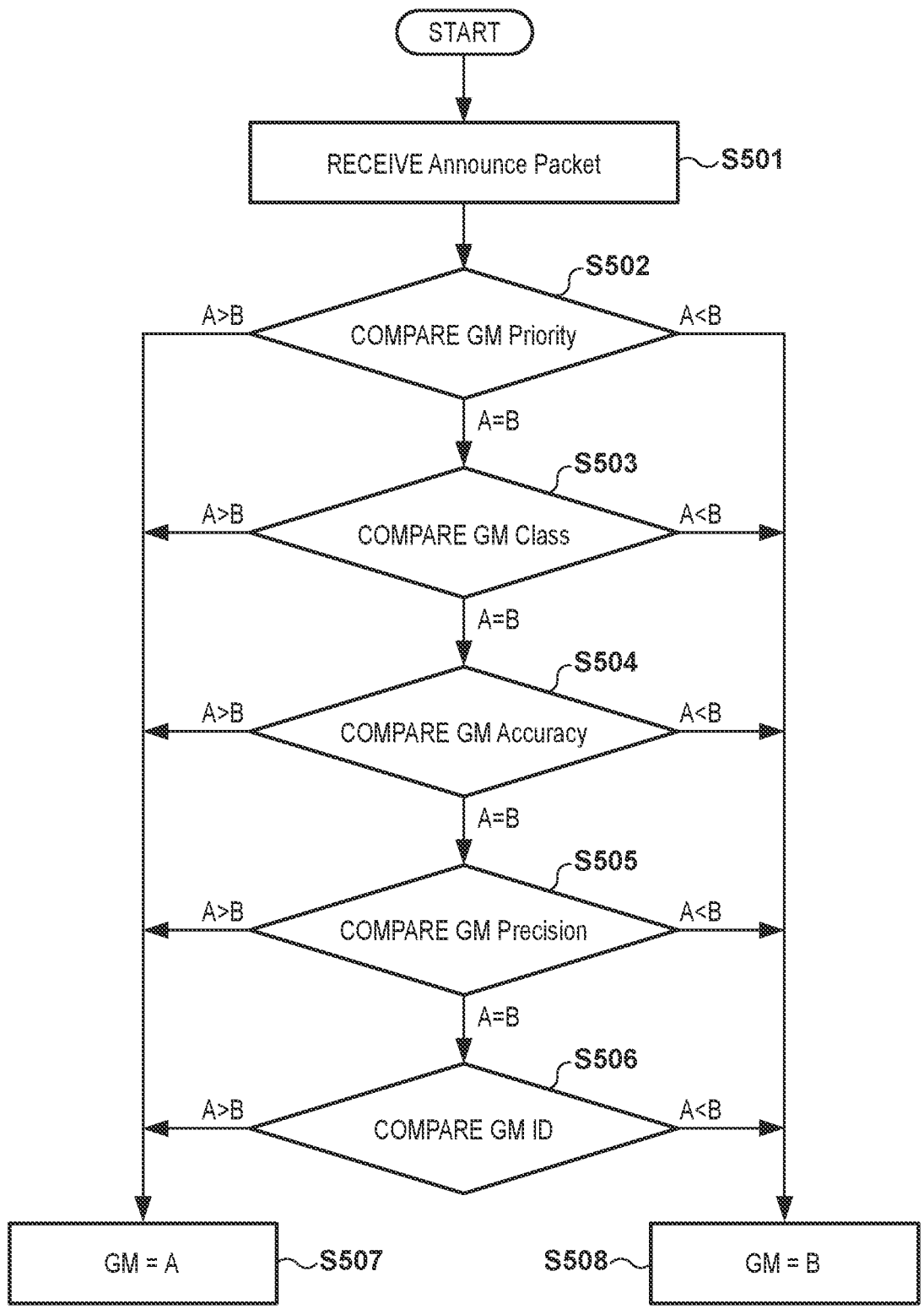

COMMUNICATION APPARATUS, COMMUNICATION METHOD, AND STORAGE MEDIUM

BACKGROUND OF THE INVENTION

Field of the Invention

The present invention relates to an improvement of a communication technique using network slices.

Description of the Related Art

The Third-Generation Partnership Project (3GPP) specifies communication using network slices obtained by virtually dividing a network per service requirement (3GPP TS23.501, V15.1.0, March, 2018).

Through communication in which network slices are used, it is possible to perform communication suitable for individual services because resources are ensured for each service. On the other hand, there are cases in which it takes time from when the network slice is provided to when the service starts and it may not be efficient for each service.

SUMMARY OF THE INVENTION

The present invention provides an optimization of a communication service technique in which network slices are used.

According to one aspect of the present invention, there is provided a communication apparatus, comprising: one or more processors; and one or more memories that store one or more computer-readable instructions for causing, when executed by the one or more processors, the communication apparatus to: request, to a network, allocation of a first network slice for executing predetermined processing required when executing a communication service executed by the communication apparatus and allocation of a second network slice for the communication service; supply a result of the predetermined processing executed in the first network slice for communication in the second network slice; and perform communication by using the result of the predetermined processing in the second network slice.

Further features of the present invention will become apparent from the following description of exemplary embodiments with reference to the attached drawings.

BRIEF DESCRIPTION OF THE DRAWINGS

FIG. 2 is a view illustrating an example of a flow of time synchronization processing executed by the communication apparatus.

FIG. 4 is a view for describing an example of a 5G QoS setting.

FIG. 5 is a view for describing a flow of selection processing of a grandmaster by BMCA.

DESCRIPTION OF THE EMBODIMENTS

Figure 1:
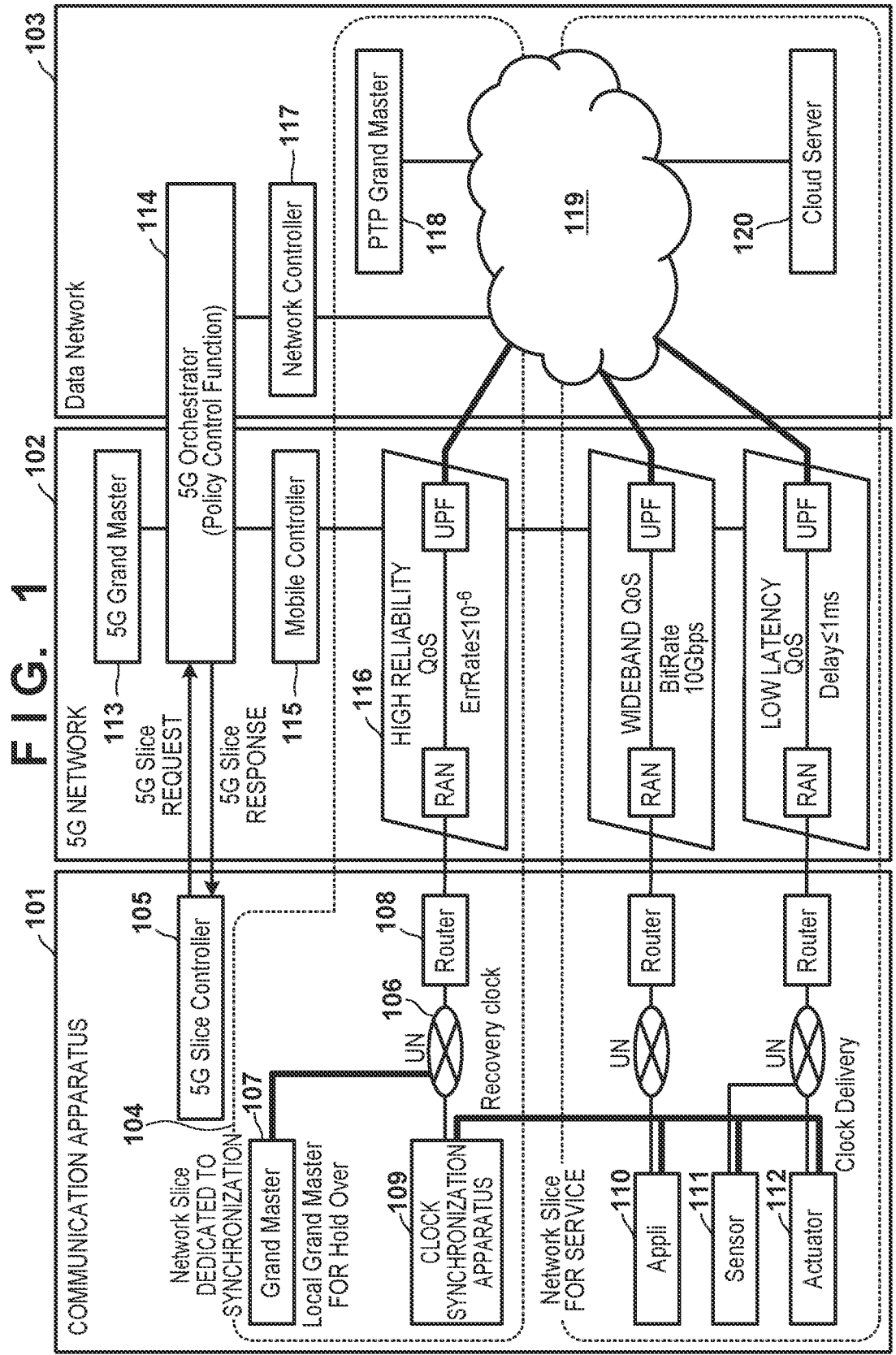
FIG. 1 is a view illustrating a configuration example of a communication system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

(System Configuration)

FIG. 1 shows a configuration example of a communication system according to the present embodiment. The communication system is configured to include, for example, a communication apparatus 101, a 5G network 102, and a data network 103. The 5G network 102 is a 5th generation (5G) cellular communication system network and is configured to include a radio access network (RAN) and a core network. Note that the core network includes a user plane function (UPF) and a control plane function (CPF). The communication apparatus 101 is configured to be able to establish a wireless connection with the RAN of the 5G network 102 to perform wireless communication. The 5G network 102 can connect the communication apparatus 101, which is a terminal of the cellular communication system, to the data network 103, which is external to the network of the cellular communication system, through UPF. The communication apparatus 101 is configured to be able to access the data network 103 via the 5G network 102, obtain information from the data network 103, and transmit information to the data network 103.

In this embodiment, in such a configuration, a network slice 104 for time synchronization is set in accordance with the request of the communication apparatus 101, and the communication apparatus 101 synchronizes the time inside the apparatus with the time of a highly reliable time server existing on the network. Note that the network slice is a virtualization unit of the network for performing services according to the application of communication. Then, the communication apparatus 101 provides the time information for which the time synchronization has been established in the network slice 104 for the time synchronization to the network slice for another service which the communication apparatus 101 itself executes. Thus, since it is not necessary to establish time synchronization for each slice, it is possible to reduce the time until the start of the communication service in the network slice for the service. Note that time synchronization is only one example. The communication apparatus 101 may establish a dedicated network slice for executing predetermined processing (such as user authentication, for example) required to execute (start in some cases) a plurality of communication services, and provide the result of the predetermined processing for communication of other network slices. Note that the predetermined processing may be processing requiring continuous communication.

For this processing, the communication apparatus 101 has, for example, a configuration as shown in FIG. 1. Note that the communication apparatus 101 includes one or more processors such as a CPU or an MPU, and can realize each function as shown in FIG. 1 by executing a program stored in an arbitrary storage apparatus such as a memory such as a ROM or a RAM. CPU is an acronym for Central Processing Unit and MPU is an acronym for Micro Processing Unit. ROM is an acronym for Read Only Memory and RAM is an acronym for Random Access Memory. Note that the communication apparatus 101 includes, for example, an antenna, a baseband chip, a circuit for wireless communication such as a radio frequency (RF) chip, and also may include a circuit or the like for wired communication. In addition, the communication apparatus 101 may have dedicated hardware for realizing some or all of the functions shown in FIG. 1. Note that it may be sufficient that the communication apparatus 101 has a configuration capable of executing the following processing, and may not necessarily have the configuration as shown in FIG. 1. That is, the communication apparatus 101 may be configured to not have some or all of the configurations of FIG. 1, and may have another alternative configurations.

The communication apparatus 101 includes a 5G slice controller 105 that controls slice setting and the like within the apparatus. The 5G slice controller 105 requests a setting of the network slice to the network side, receives a response indicating that the network slice has been set on the network side or the like, and sets the network slice within the communication apparatus 101. Also, the communication apparatus 101 includes network control apparatuses, such as a user network apparatus 106 and a router 108, for communicating with the 5G network 102 and each apparatus within the data network 103. The communication apparatus 101 has a grandmaster apparatus 107 and a clock synchronization apparatus 109 as a time synchronization function. After the network slice 104 for time synchronization is set, the clock synchronization apparatus 109 establishes time synchronization with reference to a grandmaster clock on the data network 103 via the 5G network 102, for example, by using PTP. Note that PTP means Precision Time Protocol. The grandmaster apparatus 107, based on the time synchronization established by the clock synchronization apparatus 109, operates as a grandmaster clock according to the internal clock and oscillator in the communication apparatus 101. The grandmaster apparatus 107 may output time information based on the oscillator in the communication apparatus 101. The clock synchronization apparatus 109, based on the established time synchronization, supplies time information to an application 110, a sensor 111, an actuator 112, and the like which require time synchronization, within the communication apparatus 101. Note that after the communication apparatus 101 is disconnected from the 5G network 102, for example, the clock synchronization apparatus 109 establishes time synchronization using the grandmaster apparatus 107 in the communication apparatus 101 as a grandmaster, and supplies time information.

The 5G network 102 is a network that provides RAN and core network functions in accordance with a typical 5G cellular communication standard. In one example, the 5G network 102 is configured to include a 5G orchestrator 114 and a mobile controller 115. The 5G orchestrator 114 manages network slices 116 for various services. The mobile controller 115, under the control of the 5G orchestrator 114, sets up a network slice suitable for each service. For example, in FIG. 1, for the time synchronization service, the network slice 116 is set so that the error rate such as a frame error rate, for example, is extremely low and highly reliable communication can be performed. The 5G network 102 further includes a 5G grandmaster apparatus 113. The 5G grandmaster apparatus 113 establishes time synchronization with reference to, for example, a grandmaster clock in the data network 103 (such as a PTP grandmaster 118, for example) and distributes time information within the 5G network 102. Note that the 5G grandmaster apparatus 113 may provide time information to the communication apparatus 101 as required. The data network 103 is configured to include a network 119 and includes a network controller 117 connected to the network 119, the PTP grandmaster apparatus 118, a cloud server 120, and the like.

(Processing Flow)

Next, an example of the flow of the time synchronization processing is described with reference to FIG. 2. In this processing, the communication apparatus 101 determines whether or not an application that requires QoS control is installed (step S201). In a case where an application requiring QoS control is not installed (NO in step S201), the communication apparatus 101 terminates the processing without executing the following processing. Note that here, the communication apparatus 101 may determine, for example, whether an application that requires time synchronization is installed. That is, in a case where an application that requires QoS control but does not require time synchronization is installed, the communication apparatus 101 may terminate the processing without executing the following processing. Meanwhile, in a case where an application requiring QoS control is installed (YES in step S201), the communication apparatus 101 requests the 5G network 102 to allocate a network slice for time synchronization (step S202). For example, the 5G slice controller 105 uses Network Slice Selection Assistance Information (NSSAI) to request allocation of network slices to the 5G orchestrator 114.

Figure 3A:
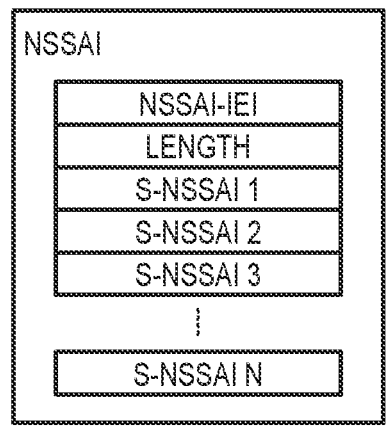
FIG. 3A is a view for describing a configuration of an NSSAI.
Figure 3B:
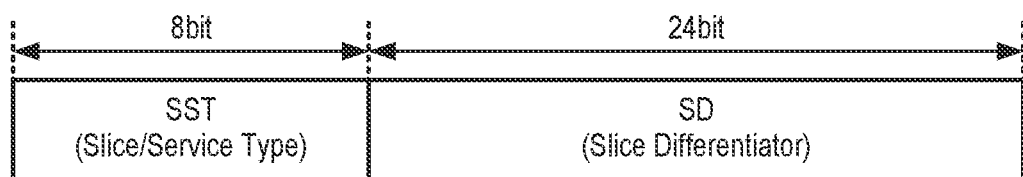
FIG. 3B is a view for describing a configuration of an NSSAI.

Here, NSSAI is described with reference to the FIG. 3A and FIG. 3B. NSSAI is identification information of the network side (such as the 5G network 102) providing the services utilized by the network slices. NSSAI contains one or more Single NSSAI (S-NSSAI). S-NSSAI consists of a Slice/Service Type (SST) and a Slice Differentiator (SD). The value indicating the service type is stored in SST. The service types include an enhanced Mobile Broadband (eMBB) in which a wideband is required, Ultra Reliable and Low Latency Communications (URLLC) in which high reliability and low latency are required, and a Mobile Internet of Things (MIoT) in which a very large number of terminal connections are required, and the like, and the SST stores values indicating any of these. SDs are used to manage network side NSSAI. As described above, in the communication in the 5G network 102, the communication characteristics are set by the service type, and the 5G orchestrator 114 instructs the mobile controller 115 and the network controller 117 to perform the setting in accordance with the communication characteristics. The 5G orchestrator 114 can determine a communication policy (control of bandwidth, delay amounts, priority order, and the like) on a slice-by-slice basis or packet-by-packet basis, and can manage and efficiently operate the consistency between the policy in the 5G network 102 and the policy in the data network 103. The mobile controller 115 performs QoS settings for each network slice within the 5G network 102.

FIG. 4 shows an example of QoS settings in a 5G network. In the example of FIG. 4, for each 5G QoS Identifier (5QI), in addition to Priority for setting the priority order, delay amount, packet loss rate, packet length, or the like are specified as QoS settings. Note that in a network slice for time synchronization (hereinafter referred to as a synchronization slice requested in step S202), it is not necessary to secure a wide frequency bandwidth, but high reliability and low latency communication characteristics are required.

In the data network 103, the network controller 117 performs QoS settings. Since the data networks are generally IP networks, Differentiated Service Code Point (DSCP) is used and transmission control is performed based on the priorities, for example, for QoS control.

When the 5G orchestrator 114 completes the setting of the synchronization slice in response to an instruction to the mobile controller 115 and the network controller 117, it transmits a response to the communication apparatus 101 indicating that the synchronization slice has been set. The communication apparatus 101 determines whether or not the allocation of the synchronization slices has been completed according to whether or not the 5G slice controller 105 has received a response (step S203). When the allocation of the synchronization slices is completed (YES in step S203), for example, communication by the PTP is performed between the PTP grandmaster 118 and the clock synchronization apparatus 109 (step S204).

PTP is a protocol standardized by IEEE1588 and in PTP, a selection of a grandmaster to be the synchronization source of a clock, which is called the Best Master Clock Algorithm (BMCA), is first performed. Here, an example of the selection process of the grandmaster by BMCA is described with reference to FIG. 5. In BMCA, the best candidate is selected from among several grandmaster candidates in the network as the grandmaster. Therefore, in PTP, the grandmaster candidate apparatus broadcasts a packet called an Announce Packet in the network at regular intervals (step S501). Then the clock synchronization apparatus 109 of the communication apparatus 101, which operates as a slave, analyzes the content of Announce Packet when receiving an Announce Packet from a plurality of grandmaster candidate apparatuses. Also, the clock synchronization apparatus 109 compares the priorities, clock quality (Class), time accuracy (Accuracy), precision (Precision), and the like described in the packets (step S502 to step S505). Note that in a case where there are two candidates of equal performance, the identifiers of the apparatus may be compared (step S506). Based on these comparisons, the clock synchronization apparatus 109 then selects the best possible candidate as the grandmaster (step S507 and step S508). In the present embodiment, it is assumed that the clock synchronization apparatus 109 selects the PTP grandmaster 118 as the grandmaster. Note that as described above, although Announce Packet is transmitted at regular intervals, the clock synchronization apparatus 109 may be such that it does not receive Announce Packet from the grandmaster in a case where the power of the selected grandmaster is turned off or the like. In a case where, the clock synchronization apparatus 109 reselects the grandmaster based on Announce Packet from other grandmaster candidates in the network. For example, the clock synchronization apparatus 109, in a case where it becomes impossible to receive an Announce Packet from the PTP grandmaster 118 due to degradation of the communication environment, may perform re-selection of the grandmaster. Then the clock synchronization apparatus 109, by this re-selection, for example, may select the grandmaster apparatus 107 or the 5G grandmaster apparatus 113 as the grandmaster. That is, the clock synchronization apparatus 109 may establish synchronization and supply time information in accordance with reference time information supplied within the apparatus or within the network of the cellular communication system.

Figure 6:
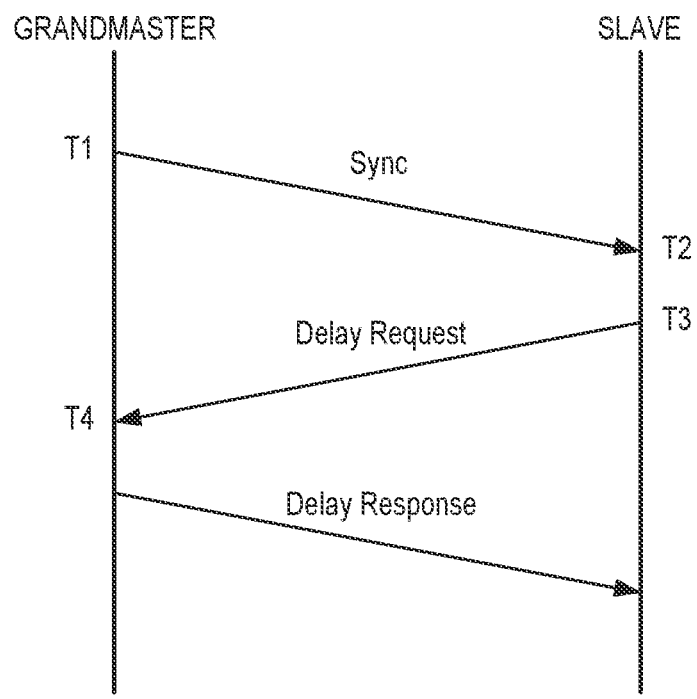
FIG. 6 is a view illustrating a flow of a procedure for estimating a transmission delay in a PTP.
Figure 7:
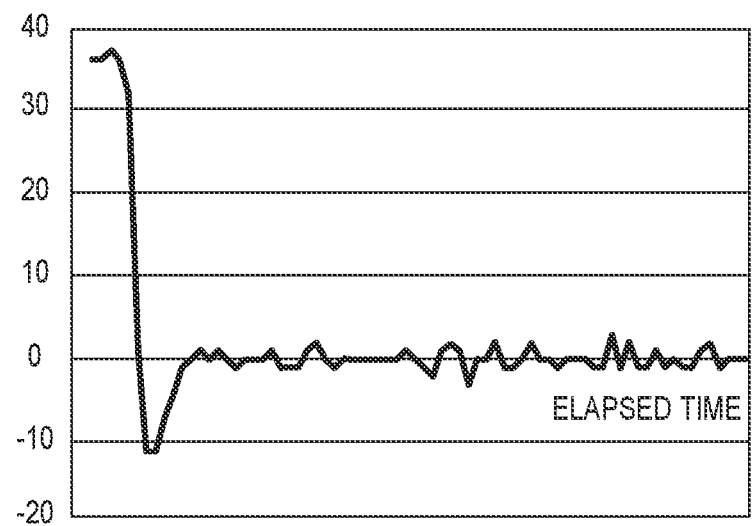
FIG. 7 is a view illustrating an example of a time change of error in a case where time synchronization processing by the PTP is executed.

The clock synchronization apparatus 109 executes a process of establishing time synchronization with the PTP grandmaster 118 by exchanging packets with the selected PTP grandmaster 118. This processing is described with reference to FIG. 6. A Sync Packet, a Delay Request Packet, and a Delay Response Packet are used to obtain the communication delay between the grandmaster and a slave. A time stamp T1 indicating the transmission time is recorded in a Sync Packet from the grandmaster, and the slave records the T1 and a time stamp T2 indicating the reception time of the packet. The slave records a time stamp T3 indicating the transmission time of a Delay Request Packet to be transmitted subsequently. When the grandmaster receives a Delay Request Packet, it transmits a time stamp T4 indicating the reception time to the slave included in the Delay Response Packet. The slave can retain all of the time stamps T1 to T4 by receiving the Delay Response Packet and recording the time stamp T4. The slave can estimate the transmission delay by calculating "transmission delay=4T4−T1)−(T3−T2))/2" using the time indicated by these time stamps. Then the slave adjust the time in themselves based on the reference time information transmitted from the grandmaster and the transmission delay. This procedure is used as a single time correction, and the delay correction is repeatedly executed at a predetermined interval. FIG. 7 shows the measurement results of the time difference between the time of the grandmaster and the time after correction of the slave in a case where this time correction is repeatedly executed. As shown in this example, in PTP, it takes a certain amount of time for the time error to converge to a sufficiently small value.

Returning to FIG. 2, the communication apparatus 101 repeatedly executes the time synchronization processing by PTP, and determines whether the times have converged (step S205) by determining whether or not a predetermined time has elapsed in a state where the correction amount is equal to or less than a predetermined value, for example. In a case where it is determined that the times have converged (YES in step S205), the communication apparatus 101 transitions to a state in which the time synchronization has been completed, and starts reproduction of the time synchronization, that is, starts output of the time information (step S206).

Figure 8:
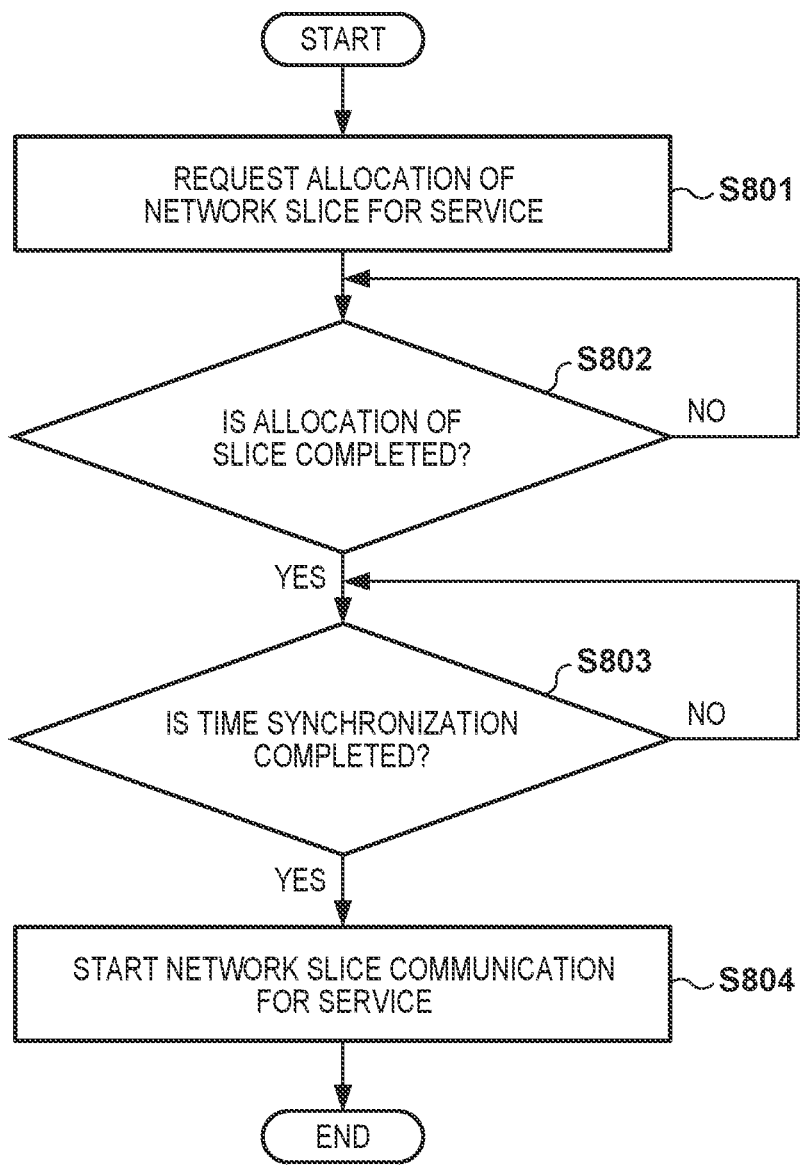
FIG. 8 is a view illustrating an example of a flow of communication using a network slice for service.

Next, an example of the flow of processing when the communication apparatus 101 starts communication for service is described with reference to FIG. 8. First, the communication apparatus 101 requests the 5G orchestrator 114 to allocate a network slice for the service in a case where communication for the service should be started (for example, in a case where a user operation is performed or communication is activated by a predetermined application) (step S801). The communication apparatus 101 requests the 5G orchestrator 114 to allocate slices by NSSAI for the service, similarly to the processing for allocating the synchronization slices. By the response from the 5G orchestrator 114, the communication apparatus 101 determines (step S802) whether or not the allocation of the network slice for the service has been completed. In a case where the allocation of the network slice for the service is completed (YES in step S802), the communication apparatus 101 confirms whether the time synchronization is completed in the synchronization slice (step S803). When the communication apparatus 101 confirms that the time synchronization is completed (YES in step S803), it starts communication by the network slice for the service (step S804).

As shown in FIG. 4, QoS control such as requested bandwidth, delay amount, bit error rate (or packet error rate), and priority control can be defined as characteristics of communication for service. As a result, different QoS controls can be applied to a video distribution service in which a large latency is allowed, to a the video communication service associated with operation of a heavy machine or operation of a surgical robot in which delay is not allowed, or the like, from among video communications. Note that as illustrated in FIG. 4, the requested bandwidth, the delay amount, the bit error rate, and the like are associated with 5QI which is the identification information, and when 5QI is included in the packet, QoS control can be performed on a packet-by-packet basis. Note that in a case where time synchronization is to be established at the start of communication for these services, the communication apparatus 101 cannot start the service until the time synchronization converges and therefore enters stand by. On the other hand, in the present embodiment, by preparing a network slice for time synchronization and converging the time synchronization in advance, the communication apparatus 101 can quickly start the service.

By virtue of the present invention, it is possible to optimize a communication service in which network slices are used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-116596, filed Jul. 14, 2021, which is hereby incorporated by reference herein in its entirety.

What is claimed is:

1. A communication apparatus, comprising:
one or more processors; and
one or more memories that store one or more computer-readable instructions for causing, when executed by the one or more processors, the communication apparatus to execute a communication method comprising:
requesting, to a network, allocation of a first network slice for executing time synchronization processing required when executing a communication service executed by the communication apparatus and allocation of a second network slice for the communication service;
supplying a result of the time synchronization processing executed in the first network slice for communication in the second network slice; and
performing communication by using the result of the time synchronization processing in the second network slice,
wherein in the performing of communication, communication by the second network slice is started after the time synchronization processing has been completed.

2. A communication method executed by a communication apparatus, the method comprising:
requesting, to a network, allocation of a first network slice for executing time synchronization processing required when executing a communication service executed by the communication apparatus and allocation of a second network slice for the communication service;
supplying a result of the time synchronization processing executed in the first network slice for communication in the second network slice; and
performing communication by using the result of the time synchronization processing in the second network slice,
wherein in the performing of communication, communication by the second network slice is started after the time synchronization processing has been completed.

3. The communication method according to claim 2, wherein in the supplying, the result of the time synchronization processing is supplied to a plurality of the second network slices.

4. The communication method according to claim 2, wherein in the requesting, in a case where there is no communication service that requires the time synchronization processing, allocation of the first network slice is not requested and allocation of the second network slice is requested.

5. The communication method according to claim 2, wherein the result of the time synchronization processing is time information.

6. The communication method according to claim 5, wherein in a case where a predetermined packet is not received from an apparatus for supplying a reference time in the time synchronization processing in the first network slice, in the supplying, time information within the communication apparatus is supplied.

7. The communication method according to claim 5, wherein in a case where a predetermined packet is not received from a first apparatus for supplying a reference time in the time synchronization processing in the first network slice, in the supplying, time information is supplied based on a reference time from a second apparatus that transmits the predetermined packet and from which the communication apparatus receives the predetermined packet.

8. The communication method according to claim 7, wherein the communication apparatus is a terminal apparatus of a cellular communication system, the second apparatus exists within the network of the cellular communication system, and the first apparatus exists outside of the network of the cellular communication system.

9. A non-transitory computer-readable storage medium that stores a program for causing a communication apparatus to execute a communication method comprising:

requesting, to a network, allocation of a first network slice for executing time synchronization processing required when executing a communication service executed by the communication apparatus and allocation of a second network slice for the communication service;
supplying a result of the time synchronization processing executed in the first network slice for communication in the second network slice; and
performing communication by using the result of the time synchronization processing in the second network slice, wherein in the performing of communication, communication by the second network slice is started after the time synchronization processing has been completed.

* * * * *